US009043631B2

(12) United States Patent
Tarui et al.

(10) Patent No.: US 9,043,631 B2
(45) Date of Patent: May 26, 2015

(54) POWER SUPPLY CONTROL SYSTEM, METHOD, AND COMPUTER PROGRAM PRODUCT

(75) Inventors: Masaya Tarui, Yokohama (JP); Koichi Fujisaki, Kawasaki (JP); Hiroyoshi Haruki, Kawasaki (JP); Tatsunori Kanai, Yokohama (JP); Haruhiko Toyama, Kawasaki (JP); Tetsuro Kimura, Tama (JP); Junichi Segawa, Kawasaki (JP); Yusuke Shirota, Kawasaki (JP); Satoshi Shirai, Kawasaki (JP); Akihiro Shibata, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 13/556,354

(22) Filed: Jul. 24, 2012

(65) Prior Publication Data

US 2013/0080813 A1 Mar. 28, 2013

(30) Foreign Application Priority Data

Sep. 22, 2011 (JP) ................................ 2011-207807

(51) Int. Cl.
*G06F 1/32* (2006.01)

(52) U.S. Cl.
CPC ............ *G06F 1/3275* (2013.01); *G06F 1/3287* (2013.01); *Y02B 60/1225* (2013.01); *Y02B 60/32* (2013.01)

(58) Field of Classification Search
CPC ............................. G06F 1/3275; G06F 1/3287
USPC .................... 713/320, 324; 711/118; 365/226
See application file for complete search history.

(56) References Cited

U.S. PATENT DOCUMENTS

| | | | | |
|---|---|---|---|---|
| 6,052,789 A * | 4/2000 | Lin | | 713/300 |
| 7,899,434 B2 | 3/2011 | Cohen et al. | | |
| 7,930,564 B2 * | 4/2011 | Arai et al. | | 713/300 |
| 8,539,159 B2 * | 9/2013 | Chauvel et al. | | 711/132 |
| 2004/0133746 A1 * | 7/2004 | Edirisooriya et al. | | 711/133 |
| 2005/0080994 A1 | 4/2005 | Cohen et al. | | |
| 2005/0204195 A1 | 9/2005 | Edirisooriya et al. | | |

(Continued)

OTHER PUBLICATIONS

Kondo, Masaaki, et al., "An Architecural Support for Compiler-Directed Fine Grain Power-Gating", Information Processing Society of Japan, 2009, vol. 2009-ARC-184, No. 14, Abstract only.

(Continued)

*Primary Examiner* — Stefan Stoynov

(74) *Attorney, Agent, or Firm* — Amin, Turocy & Watson, LLP

(57) ABSTRACT

According to an embodiment, a control system includes a detector, an estimating unit, a determining unit, and a controller. The detector detects an idle state. The estimating unit estimates an idle period. When the idle state is detected, the determining unit determines whether a first power consumption when writeback of data which needs to be written back to a main storage device is performed and supply of power to a cache memory is stopped, is larger than a second power consumption when writeback of the data is not performed and supply of power is continued for the idle period. The controller stops the supply of power to the cache memory when the first power consumption is determined to be smaller than the second power consumption and continues the supply of power when the first power consumption is determined to be larger than the second power consumption.

3 Claims, 7 Drawing Sheets

(56) References Cited

U.S. PATENT DOCUMENTS

| | | | | |
|---|---|---|---|---|
| 2007/0266268 | A1 | 11/2007 | Abbo et al. | |
| 2008/0209248 | A1 | 8/2008 | Priel et al. | |
| 2011/0112798 | A1 | 5/2011 | Branover et al. | |
| 2011/0283124 | A1 * | 11/2011 | Branover et al. | 713/323 |
| 2012/0079304 | A1 * | 3/2012 | Weissmann et al. | 713/324 |
| 2012/0117407 | A1 | 5/2012 | Kanai et al. | |
| 2012/0151119 | A1 | 6/2012 | Yoshida et al. | |
| 2012/0246356 | A1 | 9/2012 | Shibata et al. | |
| 2012/0246390 | A1 | 9/2012 | Kanai et al. | |
| 2012/0246501 | A1 | 9/2012 | Haruki et al. | |
| 2012/0246503 | A1 | 9/2012 | Fujisaki et al. | |
| 2013/0073812 | A1 | 3/2013 | Kanai et al. | |
| 2013/0080812 | A1 | 3/2013 | Shirota et al. | |
| 2013/0091372 | A1 | 4/2013 | Kimura et al. | |

OTHER PUBLICATIONS

Office Action of Notice of Rejection for Japanese Patent Application No. 2011-207807 Dated Jun. 10, 2014, 5 pgs.

Masakatsu Yamashina. “Applications of Measurement Control Enabled by System LSI”, Journal of the Society of Instrument and Control Engineers (The Society of Instrument and Control Engineers), vol. 4, No. 12, pp. 865-871 (Dec. 10, 2001).

Chinese Office Action for Chinese Patent Application No. 201210269363.6 mailed Nov. 19, 2014.

Japanese Office Action for Japanese Patent Application No. 2011-207807 mailed on Sep. 2, 2014.

Office Action for Taiwanese Patent Application No. 101126083 Dated Feb. 11, 2015, 9 pages.

* cited by examiner

POWER SUPPLY CONTROL SYSTEM, METHOD, AND COMPUTER PROGRAM PRODUCT

CROSS-REFERENCE TO RELATED APPLICATION(S)

This application is based upon and claims the benefit of priority from Japanese Patent Application No. 2011-207807, filed on Sep. 22, 2011; the entire contents of which are incorporated herein by reference.

FIELD

Embodiments described herein relate generally to a control system, a control method, and a computer program product.

BACKGROUND

In recent years, in a calculator system widely used as information equipment such as a mobile phone, a slate device or a tablet terminal and a large-scale system such as a supercomputer, a reduction of system power consumption has become an important issue. As a method of reducing power consumption, for example, a power gating technique of supplying power to only portions (units) which requires power is known.

For example, in an idle state during which the processor of a calculator system executes nothing, it is possible to reduce power consumption by stopping the supply of power to a cache memory in which part of plural pieces of data used for processing of the processor is stored. Here, since the cache memory is generally configured as volatile memory such as RAM, when the supply of power to the cache memory is stopped, all of the data stored in the cache memory is lost. Thus, when stopping the supply of power to the cache memory, it is necessary to perform a writeback process which involves writing overwritten data (data of which the content is not identical to that stored in a main storage device) among the data stored in the cache memory back to the main storage device.

However, the power consumption amount associated with the writeback process may be sometimes greater than the power consumption amount when the supply of power to the cache memory is not stopped. In this case, performing the writeback process to stop the supply of power to the cache memory does not lead to a reduction of the power consumption amount. That is, in a configuration in which the writeback process is always performed in the idle state to stop the supply of power to the cache memory, there is a problem in that it is difficult to reduce the power consumption amount efficiently.

DETAILED DESCRIPTION

According to an embodiment, a control system includes a processing device, a main storage device, a cache memory, a power supply unit, a detector, an estimating unit, a determining unit, and a controller. The processing device is configured to process data. The main storage device is configured to store therein a plurality of pieces of the data. The cache memory is configured to store therein a part of the plurality of pieces of the data stored in the main storage device. The power supply unit is configured to supply power. The detector is configured to detect whether the processing device is in an idle state in which the processing device is not executing processing. The estimating unit is configured to estimate an idle period representing a period during which the idle state is continued. The determining unit is configured to determine, when the idle state is detected, whether a first power consumption amount at the time when writeback of the data which needs to be written back to the main storage device among the data stored in the cache memory is performed and supply of power to the cache memory is stopped is smaller than a second power consumption amount at the time when writeback of the data is not performed and supply of power to the cache memory is continued for the idle period. The controller is configured to, when the first power consumption amount is determined to be smaller than the second power consumption amount, perform writeback of the data to stop the supply of power from the power unit to the cache memory when the first power consumption amount is determined to be smaller than the second power consumption amount, but when the first power consumption amount is determined to be larger than the second power consumption amount, and to continue the supply of power from the power supply unit to the cache memory without performing writeback of the data when the first power consumption amount is determined to be larger than the second power consumption amount.

Hereinafter, various embodiments will be described in detail with reference to the accompanying drawings.

First Embodiment

Figure 1:
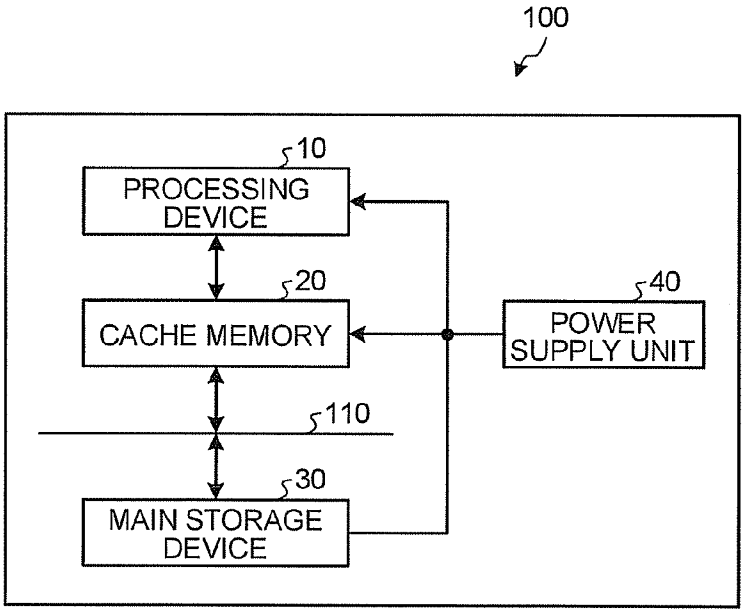
FIG. 1 is an exemplary block diagram of a control system according to a first embodiment.

FIG. 1 is a block diagram illustrating a configuration example of a control system 100 according to a first embodiment. As illustrated in FIG. 1, the control system 100 is configured to include a processing device 10, a cache memory 20, a main storage device 30, and a power supply unit 40 that supplies power. The cache memory 20 and the main storage device 30 are connected via a bus 110. Although not illustrated in detail, the control system 100 of the present embodiment also includes an external storage device such as ROM, an HDD, or a SSD, a display device such as a display, an input device such as a mouse or a keyboard, and a communication I/F device, so as to have a hardware configuration using a general computer.

The processing device 10 processes data. The processing device 10 executes various types of processing and controls the operation of the entire control system 100. The processing device 10 may be configured as a control device such as a central processing unit (CPU), for example. The main storage device 30 stores therein a plurality of pieces of data used for the processes executed by the processing device 10.

Figure 2:
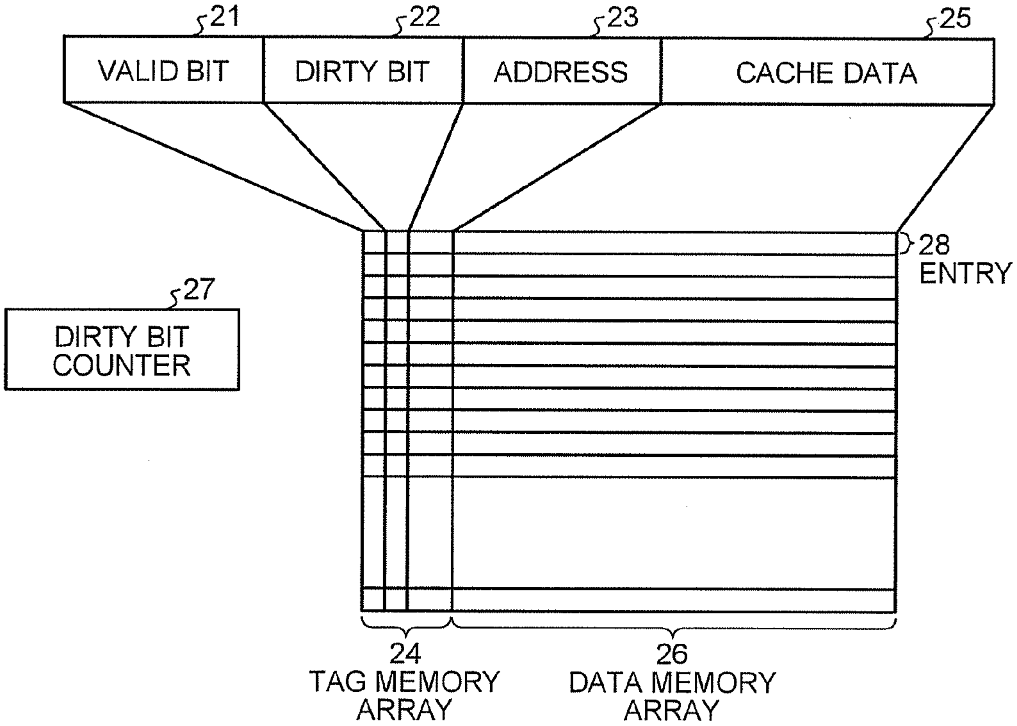
FIG. 2 is an exemplary diagram illustrating a configuration example of a cache memory according to the first embodiment.

The cache memory 20 stores therein part of the plurality of pieces of data stored in the main storage device 30. The cache memory 20 is configured as a volatile memory such as a static random access memory (static RAM), for example, and content stored therein is lost when supply of power is stopped. FIG. 2 is an exemplary block diagram illustrating a configuration example of the cache memory 20. As illustrated in FIG. 2, the cache memory 20 includes a tag memory array 24 for storing therein a valid bit 21, a dirty bit 22, and an address 23, a data memory array 26 for storing therein data 25 to be cached (hereinafter referred to as "cache data"), and a dirty bit counter 27.

The cache memory 20 stores therein data in units of entries 28, and each entry 28 includes the valid bit 21, the dirty bit 22, the address 23, and the cache data 25.

The valid bit 21 represents whether the cache data 25 of the corresponding entry 28 is valid or not. In the example of FIG. 2, when the cache data 25 of the corresponding entry 28 is valid, the valid bit 21 is set to "1". When the cache data 25 is invalid, the valid bit 21 is set to "0".

The dirty bit 22 represents whether the cache data 25 of the corresponding entry 28 is identical to data stored in the main storage device 30 at the position represented by the address 23 of the corresponding entry 28. In the example of FIG. 2, the dirty bit 22 is set to "1" when the cache data 25 of the corresponding entry 28 is not identical to the data stored in the main storage device 30 at the position represented by the address 23 of the corresponding entry 28. On the other hand, the dirty bit 22 is set to "0" when the cache data 25 of the corresponding entry 28 is identical to the data stored in the main storage device 30 at the position represented by the address 23 of the corresponding entry 28. For example, when a data transmission command (store command) is issued so that the cache data 25 of a certain entry 28 is overwritten, the dirty bit 22 of the entry 28 is set to "1". In other words, the dirty bit 22 can be regarded as information representing whether the cache data 25 of the corresponding entry 28 is data which needs to be written back to the main storage device 30.

The address 23 represents the position in the main storage device 30 at which the cache data 25 of the corresponding entry 28 is to be stored.

The dirty bit counter 27 counts the total number of the entries 28 in which the dirty bit 22 is set to "1". That is, the dirty bit counter 27 counts the total number of pieces of cache data 25 which needs to be written back to the main storage device 30 among the cache data 25.

Figure 3:
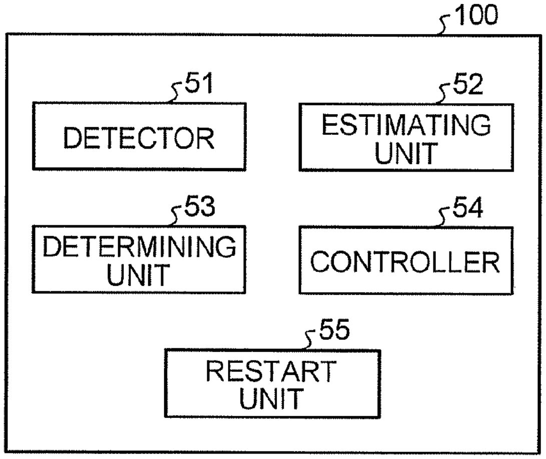
FIG. 3 is an exemplary functional block diagram of the control system according to the first embodiment.

FIG. 3 is an exemplary block diagram illustrating functions realized when the processing device 10 executes a program stored in an HDD (not illustrated) or the like. That is, FIG. 3 can be regarded as a functional block diagram of the control system 100. As illustrated in FIG. 3, the functions of the control system 100 include a detector 51, an estimating unit 52, a determining unit 53, a controller 54, and a restart unit 55. At least part of these functions may be realized as individual circuits (hardware).

The detector 51 detects whether the processing device 10 is in an idle state during which it does not execute processing. The estimating unit 52 estimates an idle period representing a period during which the idle state is continued. A method of estimating the idle period by the estimating unit 52 is optional. For example, a case where the processing device 10 enters the idle state when a device such as a key is in an operation input waiting state will be considered. Although there is an individual variation in inputting an operation of a device, the input timing of the same person is considered to be substantially the same. Therefore, the average value of intervals (referred to as an average interval) of inputting an operation may be calculated from the history of previous input operations, and a value obtained by subtracting an elapsed time after a previous input operation was received from the calculated average interval may be estimated as the idle period. For example, if the intervals of the past three input operations are 500 ms, 450 ms, and 550 ms, and the elapsed time after the previous input operation was received is 100 ms, $\{(500+450+550)/3-100\}\times1000=400{,}000$ μsec can be estimated as the idle period.

When the idle state is detected by the detector 51, the determining unit 53 performs writeback of the cache data 25 which needs to be written back to the main storage device 30 among the cache data 25 stored in the cache memory 20. Then, the determining unit 53 determines whether a first power consumption amount E1 at the time when the supply of power to the cache memory 20 is stopped is smaller than a second power consumption amount E2 at the time when writeback of the cache data 25 is not performed, and the supply of power to the cache memory 20 is continued for the idle period estimated by the estimating unit 52. More specifically, the determining unit 53 determines whether the first power consumption amount E1 is smaller than the second power consumption amount E2 using the total number (the count value of the dirty bit counter 27) of pieces of cache data 25 which need to be written back to the main storage device 30 among the cache data 25 stored in the cache memory 20 and the idle period estimated by the estimating unit 52. This will be described in further detail below.

Where an average power consumption amount when writeback is performed is Pw, an average period required for writeback of a piece of the cache data 25 is Tw1, the total number of data which need to be written back is WB, and a power consumption amount corresponding to an overhead occurring when the supply of power is restarted after the supply of power to the cache memory 20 is stopped is C, the first power consumption amount E1 is expressed by Expression (1).

$$E1=Pw\times(Tw1\times \mathrm{WB})+C \quad (1)$$

Moreover, where the average power consumption amount when power is supplied to the cache memory 20 is Po, and the idle period estimated by the estimating unit 52 is T, the second power consumption amount E2 is expressed by Expression (2).

$$E2=Po\times T \quad (2)$$

Here, when the first power consumption amount E1 is smaller than the second power consumption amount E2, Expression (3) is satisfied.

$$\mathrm{WB}<(Po/Pw/Tw1)\times T-(C/Pw/Tw1) \quad (3)$$

In Expression (3), the respective values of (Po/Pw/Tw1) and (C/Pw/Tw1) are determined depending on the configuration of the control system 100. Thus, by substituting (Po/Pw/Tw1) and (C/Pw/Tw1) with constants A and B, Expression (3) can be modified to Expression (4).

$$\mathrm{WB}<A\times T-B \quad (4)$$

That is, if the total number WB of pieces of cache data 25 which need to be written back to the main storage device 30 and the idle period T are known, by determining whether Expression (4) is satisfied, it is possible to determine whether the first power consumption amount E1 is smaller than the second power consumption amount E2.

Figure 4:
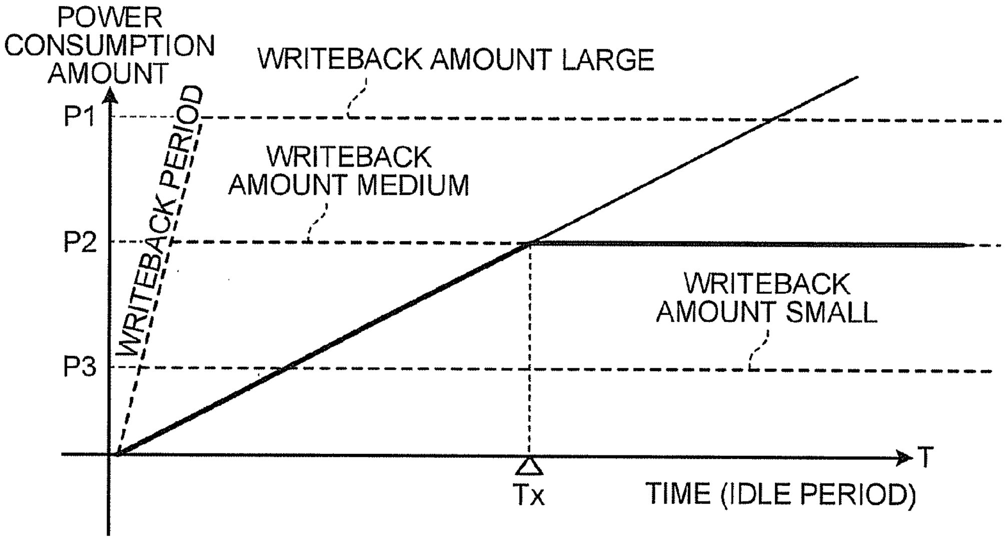
FIG. 4 is an exemplary diagram illustrating the relation between a first power consumption amount and a second power consumption amount according to the first embodiment.

For example, in FIG. 4, a power consumption amount (the first power consumption amount E1) when a first predetermined number of pieces of cache data 25 are written back is denoted by P1, a power consumption amount when a second predetermined number of pieces of cache data 25 smaller than the first predetermined number are written back is denoted by P2, and a power consumption amount when a third predetermined number of pieces of cache data smaller than the second predetermined number are written back is denoted by P3. It is assumed that the idle period T estimated by the estimating unit 52 is Tx, and the power consumption amount (the second power consumption amount E2) at the time when writeback of the cache data 25 is not performed and the supply of power to the cache memory 20 is continued is identical to P2. In this case, if the total number WB (the count value of the dirty bit counter 27) of pieces of cache data 25 which need to be written back to the main storage device 30 is smaller than the second predetermined number, the first power consumption amount E1 is smaller than the second power consumption amount E2. On the other hand, if the total number WB of pieces of cache data 25 which need to be written back to the main storage device 30 is larger than the second predetermined number, the first power consumption amount E1 is larger than the second power consumption amount E2.

The description is continued by returning to FIG. 3. When the determining unit 53 determines that the first power consumption amount E1 is smaller than the second power consumption amount E2, a controller 54 performs writeback of the cache data 25 and stops the supply of power from the power supply unit 40 to the cache memory 20. On the other hand, when the determining unit 53 determines that the first power consumption amount E1 is larger than the second power consumption amount E2, the controller 54 does not perform writeback of the cache data 25 and continues the supply of power from the power supply unit 40 to the cache memory 20.

When the restart unit 55 receives a return factor in a state where the supply of power to the cache memory 20 is stopped, the restart unit 55 controls the power supply unit 40 so as to restart the supply of power to the cache memory 20. The kind of the return factor is optional, and for example, an interrupt process may be the return factor. In this case, when the restart unit 55 receives an interrupt process in a state where the supply of power to the cache memory 20 is stopped, the restart unit 55 controls the power supply unit 40 so as to restart the supply of power to the cache memory 20.

Figure 5:
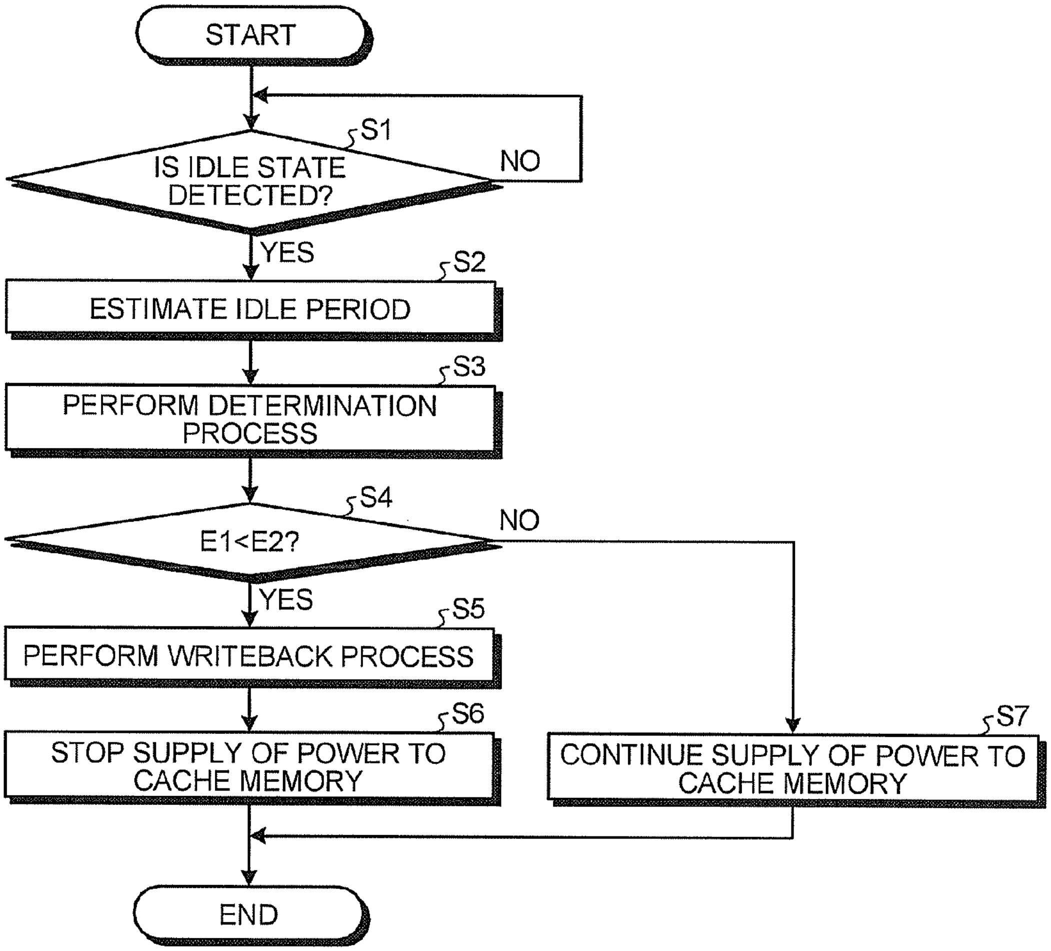
FIG. 5 is an exemplary flowchart illustrating an example of a power supply control process according to the first embodiment.

FIG. 5 is an exemplary flowchart illustrating an example of a power supply control process executed by the control system 100. The power supply control process is realized when the processing device 10 executes a predetermined software program. As illustrated in FIG. 5, when the detector 51 detects an idle state (Yes in step S1), the estimating unit 52 estimates an idle period (step S2).

Subsequently, the determining unit 53 performs a process of determining whether the first power consumption amount E1 is smaller than the second power consumption amount E2 (step S3). In the first embodiment, the determining unit 53 acquires the count value of the dirty bit counter 27 to thereby specify the total number WB of pieces of cache data 25 which need to be written back to the main storage device 30. Moreover, the determining unit 53 determines whether Expression (4) described above is satisfied using the specified total number WB of pieces of cache data 25 and the idle period T estimated in step S2. When Expression (4) described above is satisfied, the determining unit 53 determines that the first power consumption amount E1 is smaller than the second power consumption amount E2. When Expression (4) described above is not satisfied, the determining unit 53 determines that the first power consumption amount E1 is larger than the second power consumption amount E2.

For example, in Expression (4) described above, a case where the constant A is 1/100, the constant B is 100, the idle period T estimated in step S2 is 400,000 μsec, and the total number (the count value of the dirty bit counter 27) WB of the cache data 25 which needs to be written back to the main storage device 30 is 200 will be considered. In this case, since A×T−B=390 which is larger than the total number WB(=200) of pieces of cache data 25 which need to be written back to the main storage device 30, Expression (4) is not satisfied. Thus, the determining unit 53 determines that the first power consumption amount E1 is larger than the second power consumption amount E2.

When the determining unit 53 determines that the first power consumption amount E1 is smaller than the second power consumption amount E2 (Yes in step S4), the controller 54 executes a writeback process of writing the cache data 25 of the entry 28 in which the dirty bit is set to "1" in the main storage device 30 at the position represented by the address 23 of the entry 28 (step S5). After executing the writeback process, the controller 54 controls the power supply unit 40 so as to stop the supply of power to the cache memory 20 (step S6).

On the other hand, when the determining unit 53 determines that the first power consumption amount E1 is larger than the second power consumption amount E2 (No in step S4), the controller 54 controls the power supply unit 40 so as to continue the supply of power to the cache memory 20 (step S7). The power supply control process has been described above.

Figure 6:
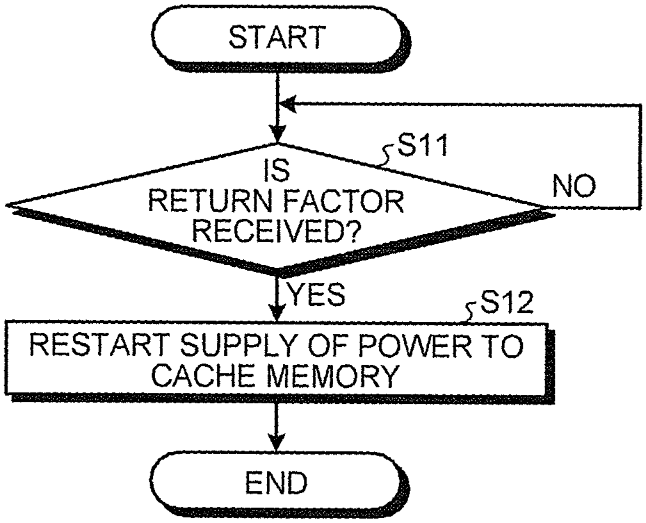
FIG. 6 is an exemplary flowchart illustrating an example of a restart process according to the first embodiment.

FIG. 6 is an exemplary flowchart illustrating an example of a restart process of restarting the supply of power to the cache memory 20. The restart process is realized when the processing device 10 executes a predetermined software program. As illustrated in FIG. 6, when a return factor is received (Yes in step S11), the restart unit 55 controls the power supply unit 40 so as to restart the supply of power to the cache memory 20 (step S12).

As described above, in the first embodiment, when the first power consumption amount E1 is determined to be smaller than the second power consumption amount E2, writeback of the cache data 25 is performed, and the supply of power from the power supply unit 40 to the cache memory 20 is stopped. On the other hand, when the first power consumption amount E1 is determined to be larger than the second power consumption amount E2, writeback of the cache data 25 is not performed, and the supply of power to the cache memory 20 is continued. Therefore, it is possible to reduce a power consumption amount efficiently as compared to a configuration in which writeback of the cache data 25 is performed when an idle state is detected regardless of the relation between the first power consumption amount E1 and the second power consumption amount E2.

Second Embodiment

Next, a second embodiment will be described. The second embodiment is different from the first embodiment in that a cache memory 200 of the second embodiment is a set-associative cache memory that includes a plurality of memory areas, for which each memory area ("bank") having data stored therein is allocated to each of a plurality of ways; and the supply of power from the power supply unit 40 to the cache memory 200 is performed for each memory area corresponding to each way. Hereinafter, portions different from the first embodiment will be described, and the same portions as the first embodiment will be denoted by the same reference numerals and description thereof will not be provided.

Figure 7:
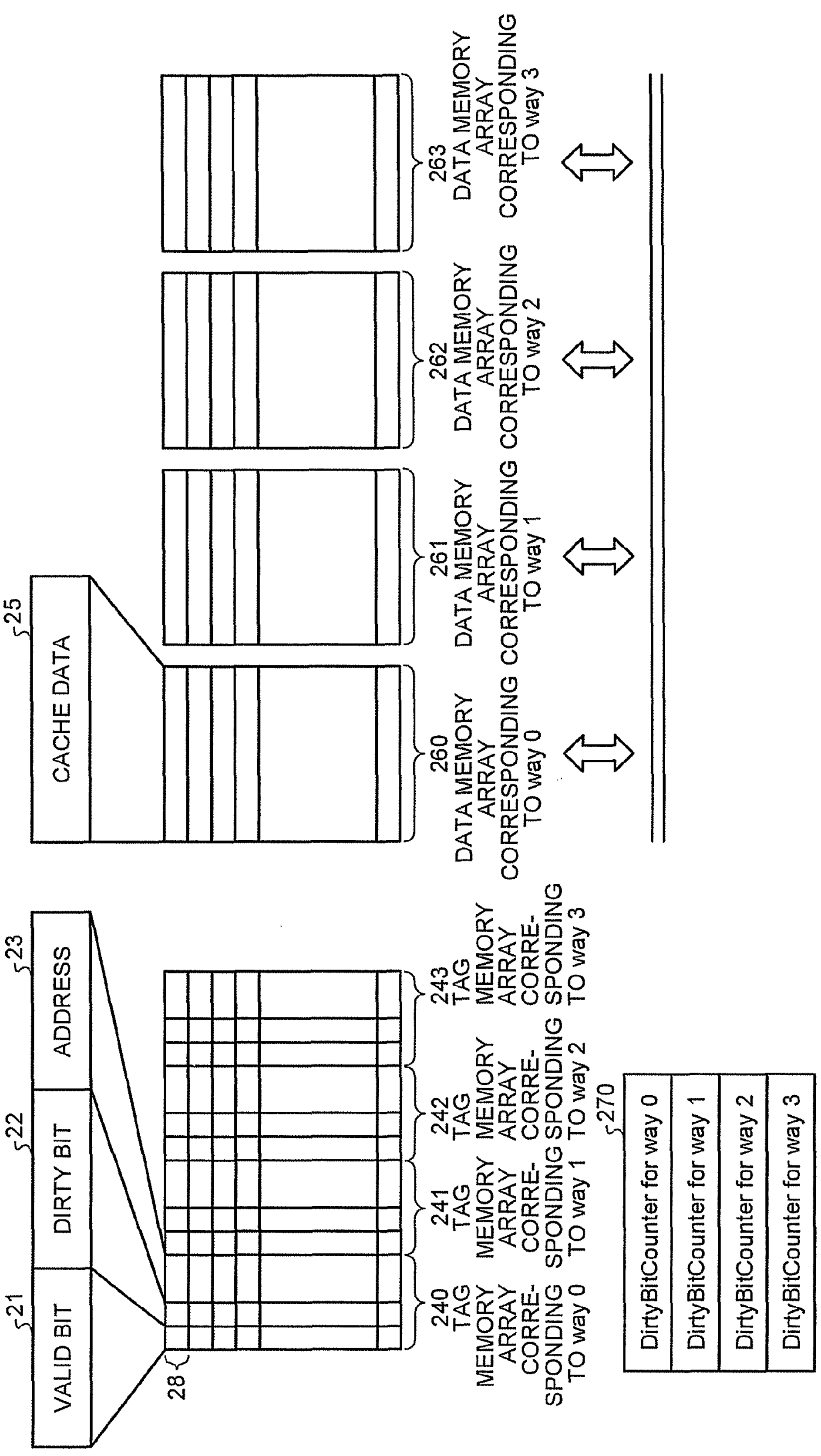
FIG. 7 is an exemplary diagram illustrating a configuration example of a cache memory according to a second embodiment.

FIG. 7 is an exemplary diagram illustrating a configuration example of the cache memory 200 of the second embodiment. As an example, the cache memory 200 of the second embodiment is a 4-way set-associative cache memory. In the example of FIG. 7, memory areas respectively allocated to four ways (way 0 to way 3) are provided in the cache memory 200. A memory area allocated to way 0 includes a tag memory array 240 corresponding to way 0 and a data memory array 260 corresponding to way 0. A memory area allocated to way 1 includes a tag memory array 241 corresponding to way 1 and a data memory array 261 corresponding to way 1. A memory area allocated to way 2 includes a tag memory array 242 corresponding to way 2 and a data memory array 262 corresponding to way 2. A memory area allocated to way 3 includes a tag memory array 243 corresponding to way 3 and a data memory array 263 corresponding to way 3. The cache memory 200 stores therein data in units of entries 28, and each entry 28 includes a valid bit 21, a dirty bit 22, an address 23, and a cache data 25 corresponding to each way. The data of respective entries 28 can be swapped between ways.

Moreover, a dirty bit counter 270 included in the cache memory 200 counts the total number of the entries 28 in which the dirty bit 22 is set to "1" for each way.

Figure 8:
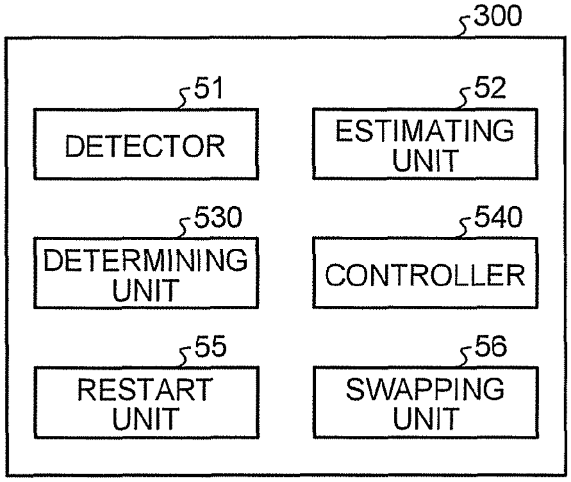
FIG. 8 is an exemplary function block diagram of a control system according to the second embodiment.

FIG. 8 is an exemplary functional block diagram of a control system 300 of the second embodiment. As illustrated in FIG. 8, the control system 300 is different from that of the first embodiment in that the functions thereof further include a swapping unit 56. The swapping unit 56 performs a process (swap process) of swapping the data of the same entry 28 between two ways. The detailed content thereof will be described later. Moreover, a determining unit 530 of the second embodiment determines whether the first power consumption amount E1 is smaller than the second power consumption amount E2 for each memory area corresponding to each way. That is, the determining unit 530 specifies the total number WB of the entries 28 in which the dirty bit is set to "1" for each memory area. Moreover, it is determined whether Expression (4) described above is satisfied for each memory area using the specified total number WB and the idle period T estimated by the estimating unit 52.

In addition, a controller 540 of the second embodiment performs writeback of the cache data 25 in which the corresponding dirty bit 22 is set to "1" among the cache data 25 stored in a memory area when the first power consumption amount E1 is determined to be smaller than the second power consumption amount E2 and stops the supply of power from the power supply unit 40 to the memory area. On the other hand, the controller 540 does not perform writeback of the cache data 25 in which the corresponding dirty bit 22 is set to "1" among the cache data 25 stored in a memory area when the first power consumption amount E1 is determined to be larger than the second power consumption amount E2 and continues the supply of power from the power supply unit 40 to the memory area.

Figure 9:
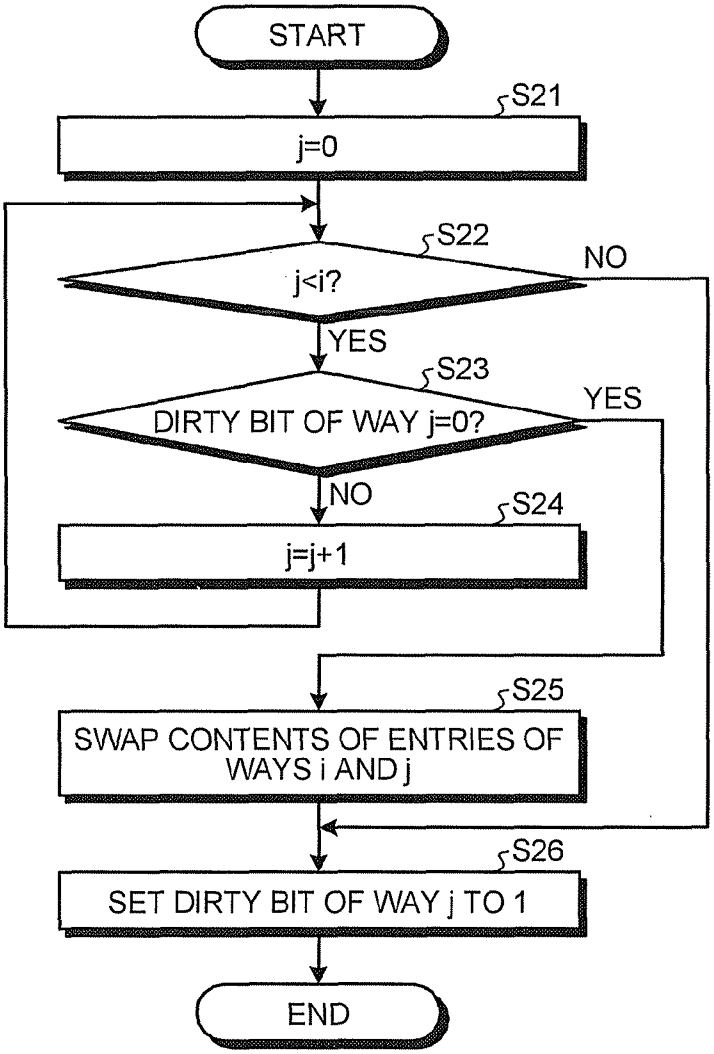
FIG. 9 is an exemplary flowchart illustrating an example of a first swap process according to the second embodiment.

FIG. 9 is an exemplary flowchart illustrating an example of a first swap process in which when it is requested to overwrite the dirty bit 22 to "1" with respect to the x-th entry 28 (a predetermined entry) of a certain way i (for example, when a store command is issued), data stored in the entry 28 is swapped with the data stored in the x-th entry 28 of another way j (i≠j).

As illustrated in FIG. 9, first, the swapping unit 56 initializes the number j representing a swapping target way j to "0" (step S21). Subsequently, the swapping unit 56 determines whether the number j is smaller than the number i representing the way i in which overwriting of the dirty bit 22 is requested (step S22). When the number j is determined to be smaller than the number i (YES in step S22), the swapping unit 56 determines whether the dirty bit 22 of the x-th entry 28 of the way j indicated by the number j is "0" (step S23). On the other hand, when the number j is determined to be larger than the number i (NO in step S22), the process proceeds to step S26 described later.

In step S23, when the dirty bit 22 of the x-th entry 28 of the way j is determined not to be "0" (NO in step S23), the swapping unit 56 counts up the value of the number j representing the swapping target way by 1 (step S24), and the process returns to step S22. On the other hand, when the dirty bit 22 of the x-th entry 28 of the way j is determined to be "0" (YES in step S23), the swapping unit 56 swaps the data stored in the x-th entry 28 of the way i with the data stored in the x-th entry 28 of the way j (step S25). Moreover, the swapping unit 56 sets the dirty bit 22 corresponding to the x-th entry 28 of the way j to "1" (step S26).

Figure 10:
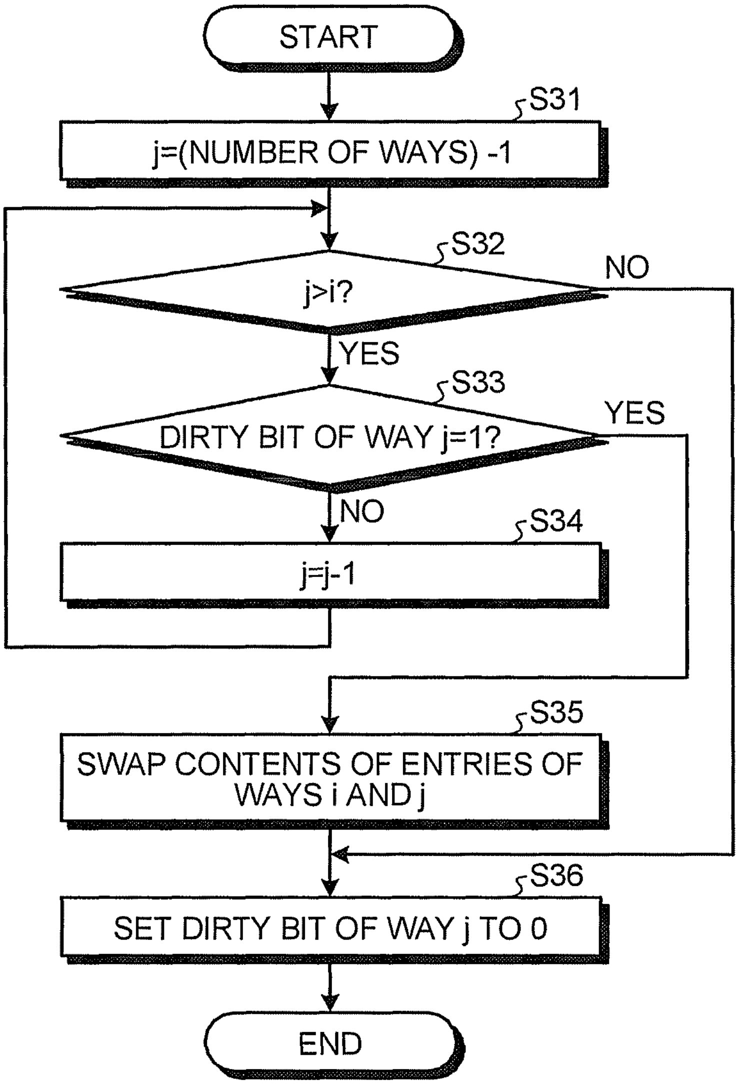
FIG. 10 is an exemplary flowchart illustrating an example of a second swap process according to the second embodiment.

FIG. 10 is an exemplary flowchart illustrating an example of a second swap process in which when it is requested to overwrite the dirty bit 22 to "0" with respect to the x-th entry 28 (predetermined entry) of a certain way i (for example, when writeback is performed), the data stored in the entry is swapped with the data stored in the x-th entry 28 of another way j.

As illustrated in FIG. 10, first, the swapping unit 56 sets a value obtained by subtracting 1 from the number of ways (in this example, "4") as the number j representing a swapping target way (step S31). Subsequently, the swapping unit 56 determines whether the number j is larger than the number i representing the way i in which overwriting of the dirty bit 22 is requested (step S32). When the number j is determined to be larger than the number i (Yes in step S32), the swapping unit 56 determines whether the dirty bit 22 of the x-th entry 28 of the way j is "1" (step S33). On the other hand, when the number j is determined to be smaller than the number i (No in step S32), the process proceeds to step S36 described later.

In step S33, when the dirty bit 22 of the x-th entry 28 of the way j is determined not to be "1" (No in step S33), the swapping unit 56 counts down the value of the number j representing a swapping target way by 1 (step S34), and the process returns to step S32. On the other hand, when the dirty bit 22 of the x-th entry 28 of the way j is determined to be "1" (Yes in step S33), the swapping unit 56 swaps the data stored in the x-th entry 28 of the way i with the data stored in the x-th entry 28 of the way j (step S35). Moreover, the swapping unit 56 sets the dirty bit 22 corresponding to the x-th entry 28 of the way j to "0" (step S36).

As described above, in the second embodiment, the data (the cache data 25 in which the dirty bit 22 is set to "1") which needs to be written back to the main storage device 30 converges in a memory area corresponding to a way having a small number. Therefore, in the idle state, the supply of power to the memory area corresponding to a way having a large number is stopped preferentially.

For example, it is assumed that the count value of the dirty bit 22 of way 0 is 800, the count value of the dirty bit 22 of way 1 is 500, the count value of the dirty bit 22 of way 2 is 200, the count value of the dirty bit 22 of way 3 is 100, the idle period T estimated by the estimating unit 52 is 400,000 μsec, and the constants A and B in Expression (4) described above are 1/100 and 100, respectively. In this case, in Expression (4) described above, since $A \times T - B = 390$, if the total number WB of pieces of cache data 25 which needs to be written back to the main storage device 30 is smaller than 390, the first power consumption amount E1 is determined to be smaller than the second power consumption amount E2. Thus, for the memory areas corresponding to ways 0 and 1, writeback of the cache data 25 is not performed, and the supply of power from the power supply unit 40 is continued. On the other hand, for the memory areas corresponding to ways 2 and 3, writeback of the cache data 25 is performed, and the supply of power from the power supply unit 40 is stopped.

In the second embodiment, although a 4-way set-associative cache memory has been described as an example, the number of ways is not limited to this, and the number of ways is optional. That is, the cache memory may include at least a first memory area allocated to a first way and a second memory area allocated to a second way.

Moreover, contrary to the second embodiment, the cache data 25 (the cache data 25 in which the dirty bit 22 is set to “1”) which need to be written back to the main storage device 30 may converge in a memory area corresponding to a way having a large number. That is, the swapping unit 56 may have a function of swapping the data stored in the first entry of the first memory area with the data stored in the second entry of the second memory area when the data stored in the first entry of the first memory area is data which needs to be written back to the main storage device 30, and the data stored in the first entry of the second memory area is not data which needs to be written back to the main storage device 30. In this way, it is possible to allow data which needs to be written back to the main storage device 30 to converge in the second memory area. The magnitude relation between the number representing the second way and the number representing the first way corresponding to the second memory area can be changed arbitrarily.

Furthermore, in the second embodiment, a case in which the cache data 25 in which the dirty bit 22 is set to “1” converges in the memory area corresponding to a way having a small number has been described. However, the cache data 25 in which the valid bit 21 is set to “1” may converge in a memory area corresponding to a way having a small number (or a way having a large number).

Moreover, the programs executed by the processing device 10 of the respective embodiments described above may be stored on a computer connected to a network such as the Internet and provided by downloading the programs via the network. Moreover, the programs executed by the processing device 10 of the respective embodiments described above may be provided or distributed via a network such as the Internet. Furthermore, the programs executed by the processing device 10 of the respective embodiments described above may be provided by being incorporated in advance in ROM or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control system comprising:

a processing device configured to process data;

a main storage device configured to store therein a plurality of pieces of the data;

a cache memory configured to store therein a part of the plurality of pieces of the data stored in the main storage device;

a power supply unit configured to supply power;

a detector configured to detect whether the processing device is in an idle state in which the processing device is not executing processing;

an estimating unit configured to estimate an idle period representing a period during which the idle state is continued;

a determining unit configured to determine, when the idle state is detected, whether a first power consumption amount at the time when writeback of the data which needs to be written back to the main storage device among the data stored in the cache memory is performed and supply of power to the cache memory is stopped is smaller than a second power consumption amount at the time when writeback of the data is not performed and supply of power to the cache memory is continued for the idle period; and a controller configured to, when the first power consumption amount is determined to be smaller than the second power consumption amount, perform writeback of the data to stop the supply of power from the power supply unit to the cache memory, but when the first power consumption amount is determined to be larger than the second power consumption amount, to continue the supply of power from the power supply unit to the cache memory without performing writeback of the data wherein the first power consumption amount is expressed by Expression (1):

$$E1=Pw\times(Tw1\times \mathrm{WB})+C \quad (1)$$

where E1 is a first power consumption amount, Pw is an average power consumption amount when writeback is performed, Tw1 is an average period required for writeback of one piece of data, WB is a total number of pieces of data which needs to be written back, and C is a power consumption amount corresponding to an overhead occurring when the supply of power is restarted after the supply of power to the cache memory is stopped, and the second power consumption amount is expressed by Expression (2):

$$E2=Po\times T \quad (2)$$

where E2 is a second power consumption amount, Po is an average power consumption amount when power is supplied to the cache memory, and T is the idle period.

2. The system according to claim 1, wherein the determining unit determines whether the first power consumption amount is smaller than the second power consumption amount using a total number of pieces of the data which needs to be written back to the main storage device among the data stored in the cache memory and the idle period.

3. The system according to claim 1, wherein the determining unit determines that the first power consumption amount is smaller than the second power consumption amount when Expression (3) is satisfied:

$$\mathrm{WB}<(Po/Pw/Tw1)\times T-(C/Pw/Tw1) \quad (3).$$

* * * * *